Patented Dec. 20, 1932

1,891,754

UNITED STATES PATENT OFFICE

LLOYD C. DANIELS, OF CRAFTON, AND CHRISTIAN J. SCHWINDT, OF PITTSBURGH, PENNSYLVANIA

GRANULATED PHTHALIC ANHYDRIDE

No Drawing. Application filed November 27, 1931. Serial No. 577,706.

This invention relates to a new form of phthalic anhydride product and to the process of preparing it.

According to the invention, phthalic anhydride is prepared in the form of granules, substantially free from dust and having a glazed surface such as to prevent the formation of dust during handling and shipping, by a controlled solidification of molten phthalic anhydride accompanied by agitation, with or without the addition of a solid phase to the molten material to aid the granulation process.

The invention is preferably carried out by agitating a pool or thin film of molten phthalic anhydride and gradually lowering its temperature in such a manner that the liquid particles as they solidify are swept away from the main body of molten liquid and thus retain a more or less regular globular shape. Large bodies of molten phthalic anhydride are difficult to break up in this way for the phthalic anhydride tends to freeze or solidify upon such small temperature changes that there is danger of the entire molten mass becoming solidified at one time, and large agitators having an enormous power consumption are necessary to disintegrate such a body of frozen material. We have found, however, that by the use of agitators having sufficiently great agitating action such as tanks having rapidly rotating arms or rotating drums provided with baffles on the inner periphery or stationary forks tending to break up the molten mass into thin streams, the liquid can be made to solidify in discrete particles which assume a spherical shape due to the surface tension of the liquid and have a glazed surface, and require only a small power input for agitation.

We have also found that the solidification and separation of the molten mass into granules is greatly aided by the addition of solid particles of phthalic anhydride to the molten material during agitation. The solid particles not only assist in separating the molten material into discrete particles but provide nuclei around which the molten material may solidify, and the solidification is greatly aided because the latent heat given off by the molten material on solidifying is taken up as latent heat of fusion of the solid particles, which melt slightly at the surfaces and thus form a bond between the solidifying molten material and the solid portion of the product. As a result of this, the final product consists of a nucleus of originally solid phthalic anhydride, which in itself has a tendency to form dust when packed or shipped, surrounded by a glazed coating of phthalic anhydride which has been solidified from the molten state under agitation and which has no tendency to form dust, the two portions being firmly bound together by a mass of interwoven crystals resulting from the partial melting of the solid surface upon exposure to the molten material.

The invention is not dependent upon any definite temperature ranges but it is of course desirable to use apparatus which is steam jacketed or otherwise heated to prevent freezing of the molten mass and to maintain constant operating temperatures irrespective of atmospheric conditions. Any apparatus may be used which provides a receptacle provided with means for introducing and agitating the molten material and removing the solidified particles from the main body of molten liquid, ordinary agitators having flat or concave surfaces provided with moving rakes which tend to force the solid material outwardly being suitable. Drum agitators, in which the rotating drum is provided with baffles or buckets on its interior periphery and with a pan or other receptacle in the center to catch the solidified material as it falls may also be used with good results, it being understood that in any case the apparatus will be provided with means for introducing solid particles of phthalic anhydride to the molten mass if desired. The apparatus is preferably enclosed in order to provide constant temperature conditions and to minimize volatilization and formation of phthalic anhydride fumes.

The invention will be further described in conjunction with the following specific examples, which are for illustrative purposes only and to which it is not limited.

*Example 1*

Molten phthalic anhydride, such as that obtained from the distillation purification of a converter product from the catalytic oxidation of naphthalene, is fed continuously or intermittently into an agitator similar to the Mannheim furnace, the floor of which is slightly concave, with rakes set to continuously move the solidfied material toward the outer periphery. In this apparatus the phthalic anhydride is gradually worked out into a comparatively thin film and solidifying particles are caught by the rakes and moved toward the outer periphery as they are cooled.

*Example 2*

Molten phthalic anhydride, obtained as in Example 1 from the melting of crystals of sublimed phthalic anhydride, is fed into an agitator similar to that described in the foregoing example, but during agitation solid particles of phthalic anhydride are added in amounts of 40–70% by weight of the entire mass. Agitation is continued until the molten phthalic anhydride has solidified on the surfaces of these solid particles, the revolving rakes serving to produce a thorough mixture and to agitate the mass so that a product of uniform particle size is obtained.

The phthalic anhydride particles may be obtained in any desired manner; for example, those produced by the comminution of phthalic anhydride crystals as described in Patent No. 1,789,967 to Daniels and Schwindt may be used. Excellent results may also be obtained by adding flakes of phthalic anhydride which are obtained by solidifying molten phthalic anhydride on the surface of a water cooled drum and removing the product by a scraper on the opposite side, or the dust obtained by sifting these flakes may be used. Shreds of phthalic anhydride obtained by grinding or chipping blocks of solidified material may also be used and it is an advantage of the invention that the dusting which takes place when all these products are packed and shipped is entirely prevented by the glazed, closely adhering coating which is formed upon solidification of the molten material.

*Example 3*

A stream of molten phthalic anhydride is continuously or intermittently fed into an inclined, rotating bowl, preferably having fins or other agitating means on its inner periphery, and revolving at such a speed that solid particles are thrown off over the lower edge of the bowl while the liquid is retained by reason of its greater surface tension. Preferably, a continuous or intermittent stream of solid particles of phthalic anhydride, such as the comminuted phthalic anhydride crystals referred to in Example 2, is fed into the bowl along with the molten phthalic anhydride, the agitation produced by rotation of the bowl being such that these particles are quickly covered with a solidifying coating of the molten material, producing granules which are thrown out over the lower edge of the bowl. The product is preferably collected on a conveyor or other collecting means and is ready for immediate packing and shipment.

What is claimed as new is:

1. A process of granulating phthalic anhydride, which comprises agitating a pool of molten phthalic anhydride and gradually lowering its temperature during the agitation.

2. A process of granulating phthalic anhydride, which comprises agitating a pool of molten phthalic anhydride and gradually lowering its temperature, the intensity of agitation being such that solidified particles are swept away from the molten mass as fast as they are formed.

3. A process of producing granulated phthalic anhydride, which comprises agitating a mass of molten phthalic anhydride and simultaneously adding particles of solid phthalic anhydride.

4. A process of granulating phthalic anhydride, which comprises agitating a pool of molten phthalic anhydride and simultaneously adding particles of solid phthalic anhydride, the intensity of agitation being such that the coated particles so formed are swept away from the molten mass as fast as they are formed.

5. A process according to claim 3, in which the solid particles consist of comminuted phthalic anhydride crystals.

6. A process according to claim 3, in which the solid particles consist of flakes of phthalic anhydride.

7. A process according to claim 3, in which the solid particles consist of phthalic anhydride dust.

8. As a new product, granulated phthalic anhydride, the granules having a hard, glazed outer coating produced by solidifying a liquid coating of phthalic anhydride upon the surface of an originally solid phthalic anhydride particle.

9. As a new product, phthalic anhydride in the form of granules having an originally solid nucleus surrounded by a glazed outer coating, the nucleus and outer coating being connected by a bond of interwoven crystals.

10. As a new product, granules of phthalic anhydride having an inner nucleus of phthalic anhydride in a form capable of producing dust surrounded by a glazed outer coating of phthalic anhydride.

11. As a new product, phthalic anhydride in the form of granules having a glazed outer coating and a uniform nucleus comprising a solidified body of molten phthalic anhydride produced by the rapid agitation of an extended body of the product during cooling.

Signed at Pittsburgh, Pennsylvania, this 25th day of November, 1931.

LLOYD C. DANIELS.
CHRISTIAN J. SCHWINDT.